Aug. 19, 1969  A. GARVE  3,462,071
ARRANGEMENTS FOR RADIAL FLOW COMPRESSORS FOR SUPERCHARGING
INTERNAL COMBUSTION ENGINES
Original Filed April 29, 1966  2 Sheets-Sheet 1

Alexander Garve
Inventor
by Greer Maréchal Jr.
his attorney

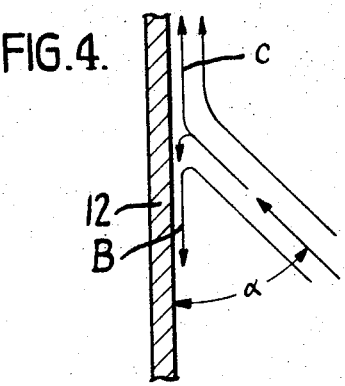
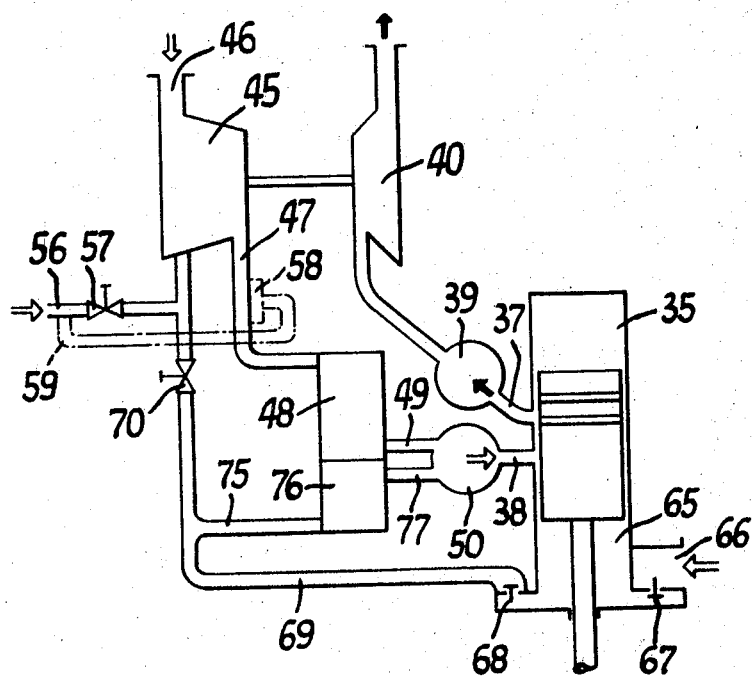

United States Patent Office 3,462,071
Patented Aug. 19, 1969

3,462,071
ARRANGEMENTS FOR RADIAL FLOW COMPRESSORS FOR SUPERCHARGING INTERNAL COMBUSTION ENGINES
Alexander Garve, Augsburg-Hochzoll, Germany, assignor to Maschinenfabrik Augsburg-Nurnberg AG, Augsburg, Germany, a corporation of Germany
Continuation of application Ser. No. 546,456, Apr. 29, 1966. This application Apr. 4, 1968, Ser. No. 718,957
Claims priority, application Germany, May 4, 1965, M 65,103
Int. Cl. F04d 27/02; F01k 23/14; F02b 33/12
U.S. Cl. 230—114                                5 Claims

ABSTRACT OF THE DISCLOSURE

Apparatus as provided in accordance herewith as a radial flow rotary compressor for exhaust-driven superchargers for supercharging a two-cycle internal combustion engine, with which apparatus is provided a source of auxiliary gaseous propellant and nozzle means for directing the auxiliary propellant against the trailing faces of the compressor blades for providing an additional driving force thereto, with said nozzle means being disposed obliquely radially outwardly in the direction of the impeller blades to direct said auxiliary propellant at an angle to the blades for producing, in addition to said auxiliary driving force, an encompassing gaseous envelope about the circumference of the said blades acting as an aerodynamic throttle to enhance the uniformity and efficiency of performance of said compressor particularly at slow or idle speeds of said internal combustion engine.

---

This application is a continuation of application Ser. No. 546,456, filed Apr. 29, 1966, and now abandoned.

This invention relates to radial flow compressors as may be used for the supercharging of internal combustion engines and, more particularly, to arrangement for such compressors as used for exhaust-powered superchangers whereby the advantages and efficiencies of such radial flow compressors are increased, and the operation thereof under various load and driving conditions can be optimized at a variety of desired stable operating conditions by interjecting a power stream of auxiliary driving fluid to act on the compressor blades in improved manner.

As is well known, radial flow compressors possess advantages over axial flow compressors in that relatively higher pressures can be produced in a single stage with the radial flow design. Thus, they might be considered highly desirable for the supercharging of internal engines, providing stable operation and driving thereof are adequately achieved. Considering, however, the use of any rotary compressor as a supercharging devices for an internal combustion engine (particularly a large diesel engine arrangement) where the compressor is driven by an exhaust gas turbine, difficulties may be encountered where the driving power available from the exhaust gases from the internal combustion engine may be sufficient merely to drive the gas turbine driving the supercharging compressor at a certain maximum output. There may not be the extra power as needed for rapid accelerations and/or other power requirements for optimumly efficient operation of a radial flow compressor, blow-off air, capacity for surge prevention, or pulsation control, etc., without some additional source of auxiliary driving air or power supplied somehow to the supercharging device other than from merely the engine exhaust gas capacity.

Even given some such auxiliary source of propellant gas or driving fluid, a number of difficulties or disadvantages may be encountered in attempting to use such auxiliary source of fluid to supplement the power capacity produced by the internal combustion engine exhaust gases. For example, if an auxiliary source of compressed air is provided for temporary supplementary impingement upon the driving impeller of an exhaust gas turbine in situations where an inadequate supply of energy is provided by the exhaust gases, substantial inefficiencies, such as windage losses from idly rotating turbine blades, may occur in a turbine designed to accommodate temporary extra compressed air driving force during those periods of operation (which are the greater part of the time of the engine) where the exhaust gas capacity is sufficient without the auxiliary driving fluid. Such difficulties may also be encountered when an additional source of compressed air is utilized as a temporary or intermittent boosting impinging directly upon the compressor impeller blades, even though the latter arrangement may have the advantage of letting the auxiliary compressed air be incorporated into the main feed stream of the compressor utiilzed for supercharging the cylinders of the engine.

If, on the other hand, auxiliary jet nozzles are arranged for impingement at the inlet of axial flow compressors to supplement the turbo drive thereof, other difficulties may be encountered upon an attempted transfer of this principle to radial flow compressors. For example, however, readily one may utilize such auxiliary driving jets directly on the blades of an axial flow compressor (so those blades act as both turbine blades and compressor blades), a substantial structural disadvantage may be found with radial flow compressors in that merely the interposition of such nozzles substantially reduces the cross-section of the compressor intake. Also, due to the design of a radial flow compressor, the circumferential flow velocity is relatively low at the impeller intake and, thus, any auxiliary propellant agent should have only a relatively low velocity and velocity energy in order to avoid impact losses with the compressor blades so that the desired rapid acceleration when needed is relatively difficult to achieve in a design of overall commercial expediency.

Additionally, if it is attempted to subject the radially outer ends of radial compressor impeller blades to auxiliary jet nozzles as has been statisfactorily utilized in directing auxiliary compressed air to the radially outer tips of an axial flow compressor, additional difficulties which may well negative any possible advantage may be encountered in that such auxiliary jets are necessarily directed in a direction opposite to the feed stream of compressed air exiting from the radially outer tips of the impeller blades to an extent where the desired flow conditions in the outlet compressed gas stream are disrupted and/or excessive energy losses occur.

According to this invention, by contrast, auxiliary sources of propellant fluid are supplied directly to the outer portions of the impeller blades of radial flow compressors in such manner and direction as to cause the blades to serve at the same time as turbine blades, with the direction of such auxiliary propellant flow being established to give the greatest possible impulse force with the smallest amount of propellant deflected in a radially inward direction, and in such manner that the auxiliary propellant streams, in addition to pure impulse action, also may provide a so-called jet flap or throttling action at the outlet end of the impeller blade channel, similar to that achieved with compressors having the channel tapering toward the outlet thereof, and in controllable manner by varying the amount of auxiliary propellant fluid. As a further feature of this invention, compressors embodying the features hereof are particularly adapted for supercharging internal combustion engines which are also equipped to deliver the auxiliary propellant fluid as air compressed and delivered by the bottom side of the engine piston during the downstroke thereof, although the auxiliary propellant fluid may be provided from virtually any source of pressure fluid, including even the blow-off from a conventional pulsation limit control on the compressor itself.

With the foregoing and additional objects in view, this invention will now be described in more detail, and other objects and advantages thereof as will be apparent from the following description, the accompanying drawings, and the appended claims.

FIG. 4 is a flow pattern diagram of the impingement of the auxiliary propellant fluid jets onto one of the radial compressor impeller blades; and FIG. 5 is a schematic flow diagram indicating generally the mechanical and gas flow connections in a situation where a compressor embodying and for practising this invention is utilized as a turbo powered supercharger for an internal combustion engine within the teachings hereof.

Figure 1:
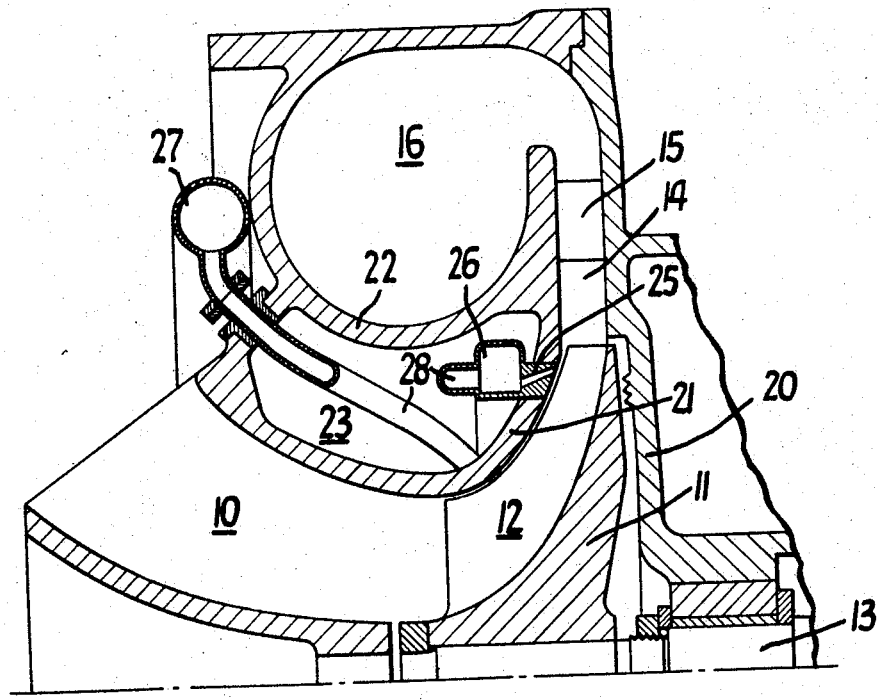
FIG. 1 is a partial vertical section through the top half of a radial compressor embodying and for practising this invention.

Referring to the drawings, in which like reference characters refer to like parts throughout the several views thereof, the upper half of a radial flow compressor is shown in FIG. 1 (the lower half being substantially identical) as comprising an annular inlet channel 10, and an impeller wheel 11 having impeller blades 12 thereon, a compressor drive shaft 13, an outlet channel 14, having a diffuser 15 therein and leading to the compressed air collecting duct 16—all in a known and well-understood manner with radial flow air compressors. The impeller wheel and blading 11, 12 are enclosed between an outer housing 20 and inner housing wall 21, the latter of which, together with wall 22 of collecting duct 16, encloses an annular space 23.

Disposed in inner housing wall 21 there is provided an air nozzle arrangement for injection of auxiliary air or other propellant fluid to impinge upon blades 12 adjacently the radially outer tips thereof. In the embodiment shown in FIG. 1, such auxiliary nozzle arrangement is illustrated as a relatively narrow annular nozzle or slit 25 in flow communication with an annular conduit 26 through which circumferential flow of air or other propellant fluid is produced by tangential introduction of the propellant fluid from an annular distribution manifold 27 through a plurality of tangentially directed feed lines 28.

Figure 2:
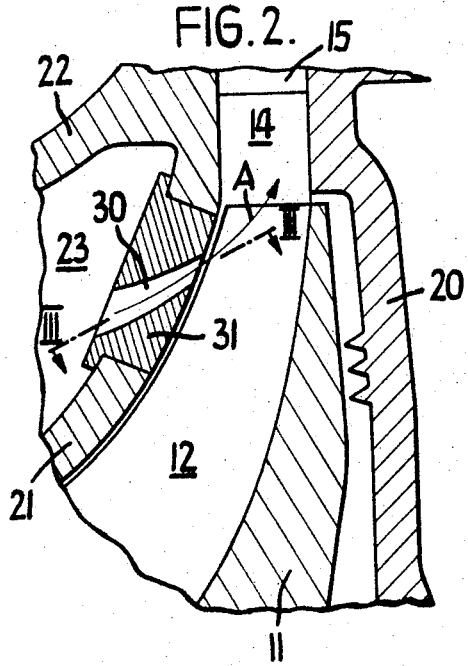
FIG. 2 is a partial vertical section on substantially the same plane as FIG. 1 and showing an additional embodiment of the auxiliary propellant fluid injection nozzles in accordance herewith.
Figure 3:
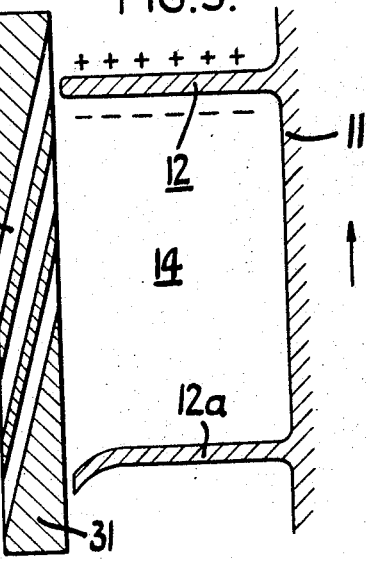
FIG. 3 is a partial section taken along the line III—III of FIG. 2 and developed on the plane of the drawing.

In the embodiment illustrated in FIGS. 2 and 3, the auxiliary injection nozzle arrangement is illustrated as comprising, instead of annular slit 25, etc., a plurality of bladed nozzles 30 formed in an annular member 31 extending around inner housing wall 21, and, in this embodiment, annular space 23 itself suitably closed, serves as a distribution manifold for propellant fluid injected through the various nozzles 30.

As indicated in the diagram of FIG. 4, propellant fluid emerging from the nozzles 25 or 30, which are disposed at an angle with respect to the outer tips of impeller blades 12, strikes blades 12 at an angle $\alpha$, with the result that a portion is deflected radially inwardly as indicated by arrow B. In accordance herewith, then, angle $a$ of nozzle 25 or 30 is selected, for the design or dimensioning of a particular compressor, to provide for the greatest possible impulse force of the injected propellant against blades 12 for circumstances where the greatest part of the propellant is deflected in the direction of arrow C and the least portion deflected inwardly along arrow B.

In this manner, the greatest impulse force is achieved from the auxiliary propellant injection and the most rapid effect thereof achieved on blades 12 for the increased compressing capacity thereof, with the least amount of disturbance and energy loss from radially inwardly deflected flow, although the actual selecting of a particular angle $a$ for a particular compressor design is a matter well within the skill of the art once the teachings hereof, and particularly the foregoing, are understood. Also, as will be understood from the foregoing, advantages are obtained in radial flow compressors designed in accordance herewith even when, for one reason or another, angle $a$ is not precisely at the value which maximizes the impulse-deflection correlation desired or preferred as indicated in the FIG. 4 diagram.

As is well understood, with radial flow or centrifugal compressors, higher pressures are established at the leading side of each impellor blade than at the trailing side, as indicated in FIG. 3 by the plus and minus signs, with the impellor wheel 11 turning in the direction of the arrow. Such a situation frequently results to a so-called "jumping" of the flow, particularly in the case of excessively high relative back pressures or pressure differentials. With the introduction of auxiliary compressed propellant in accordance herewith, at approximately the same pressure as the compressed air on the leading side of the blade, the region of lower pressure behind each blade 12 is eliminated or filled up, so that the possible unstable operation is substantially prevented adn the compressor efficiency is substantially improved.

Additionally, as will be apparent from the arrow A in FIG. 2 indicating the flow of the preponderance of the auxiliary pressure fluid against blades 12, the auxiliary injection of propellant in accordance herewith through nozzles 25 or 30 adjacent the outer tips of blades 12 and at a driving angle with respect thereto, also acts as a "jet flap" whereby there is achieved some throttling of the outlet cross-sectional area of each portion of outlet channel 14 between adjacent blades 12 in a manner, as will be understood, which also contributes to the preventing of surging at the compressor outlet. As a further feature for promoting both efficiency and stable, smooth operation of compressors in accordance herewith, it may be desired to form at least the radially outer tips of blades 12 in the manner indicated with the lower blade 12a in FIG. 3—i.e., to form the blades with the free edge curved slightly backward away from the direction of rotation—in order to reduce or attenuate the entering flow of auxiliary propellant fluid from the successive nozzles 30 as blades 12a passes effectively adjacent each nozzle 30.

As noted above, a radial flow compressor, in accordance herewith, is particularly adapted for use as an exhaust-driven turbo supercharger for an internal combustion engine, and such an arrangement is schematically illustrated in FIG. 5. Referring to the diagram, a cylinder of an internal combustion engine is indicated at 35 having a piston 36 reciprocating therein, an exhaust line 37, and an intake line 38. In the diagram, black arrows indicate the flow of exhaust gases from cylinder 35, while white or open arrows indicate the various lines of flow of supercharging air.

Thus, exhaust gases leave cylinder 35 through line 37 into a collector 39, from which they are fed as driving fluid to a turbine schematically indicated at 40, which turbine is in mechanical driving engagement with a radial flow compressor having this invention applied thereto and indicate schematically at 45 as having an intake 46 and an outlet 47 leading, optionally, to a cooler 48 and, thence, through line 49 to air collector 50, from which the supercharging air enters cylinder 35 through intake line 38 at the proper cycle of the engine.

The auxiliary propellant fluid in accordance herewith is fed to compressor 45 as indicated by conduit 55, and such propellant fluid may be initially provided or supplied from one or more of a variety of sources, as indicated on the diagram. For example, the auxiliary propellant may be supplied by an additional compressor (not shown) or other source connected to conduit 56 as controlled by valve 57. If compressor 45 is operated with a pulsation controlling blow-off (schematically indicated by the dot-dash lines at 58), the blown-off air is readily utilized as at least a part of the auxiliary propellant (as indicated by dot-dash conduit 59) and returned to the compressor for obtaining extra work therefrom as it is injected against the outer tips of the impeller blades in accordance herewith.

Satisfactory results are also achieved in accordance herewith (and, with two-cycle diesel engines, may be preferred here) by having the lower portion 65 of engine cylinder 35 and piston 36 constructed as a pump so that, on the upward stroke of piston 36, air is drawn into the lower portion 65 of the cylinder through air intake 66 and intake valve 67, while, on the downward stroke of piston 36, such air is compressed beneath the descending piston and pumped out of outlet valve 68 into outlet conduit 69 to be introduced through valve 70 into auxiliary propellant line 55 of compressor 45. Optionally, a portion of this piston-pumped air may be introduced through conduit 75 to a cooler 76 and, thence, through conduit 77 directly into collector 50 for injection into cylinder 35 through intake 38 during the intake and scavenging cycle of piston 36.

As will be apparent from the foregoing, there are thus provided in accordance herewith advantageous arrangements for increasing the output of a radial flow compressor, particularly when used as a supercharger for an internal combustion engine, by auxiliary means other than the normal driving fluid for the driving turbine, especially in such instances where the exhaust gases of the engine are insufficient by themselves to produce sufficient turbine output to achieve the desired supercharging and/or other instances where a more rapid acceleration of the main engine is desired requiring increased supercharger output more than can be directly achieved from the accelerating effect of exhaust gases on a compressor-driving turbine.

As will be apparent, the utilization of some auxiliary source of propellant fluid directed, in accordance herewith, to impinge directly on the compressor impellor blades for added driving force also has the further advantage that such auxiliary propellant fluid will be admixed into the compressor outlet stream and, hence, will be included as a part of the supercharging combustion and scavenging gases entering the cylinder, thereby being a more efficient use of whatever is the source of auxiliary propellant than would be the case if the same auxiliary propellant were merely introduced into the compressor-driving turbine for acceleration thereof, and exhausted with the spent propellant fluid driving the turbine. That is, regarding either auxiliary compressed air supplied from an outside source (such as an auxiliary compressor or a bottom pump of the engine pistons themselves or blow-off air from a pulsation control of the compressor itself), greater efficiencies are achieved in accordance herewith if such auxiliary compressed air sources are utilized for direct impingement on the compressor impeller blades for admixture with the supercharging air stream, because such auxiliary propellant is admixed with the air stream, is utilized for scavenging and/or combustion in the cylinder, and forms a part of the exhaust gases driving the supercharger turbine.

Thus, the overall efficiency, regardless of the source of such auxiliary propellant, is enhanced in accordance herewith as compared to other arrangements where auxiliary propellant fluids, from whatever source derived, may be caused to act on the compressor-driving turbine in instances where increased load or desire for sharp acceleration demand greater output from the compressor. Indeed, such contribution to the overall efficiency from the auxiliary propellant includes, as taught here, the quantitative contribution of auxiliary propellant itself, in addition to whatever extra impulse or driving force it imparts to the compressor blades.

Furthermore, in accordance with the invention, as compared with other arrangements involving takeoff of extra air behind the compressor and/or interjecting auxiliary driving propellant to the supercharger turbine and/or injecting auxiliary air into the conduit leading from the supercharger to the engine, there are eliminated here any branches or other connections in the supercharged air conduit which might interfere with the normal operation thereof, as well as eliminating the necessity for lengthening or constricting or otherwise complicating the normal conduit arrangements from supercharger to the engine. Also, undesirably wide temperature gradients at any point in the system may conveniently be avoided, while still obtaining the shortest possible lag interval between the start of a desired acceleration until the actual obtaining of higher compressor speed, because the auxiliary propellant fluid exerts a direct impulse on the impeller blades of the compressor as well as contributing itself to the increased quantity of compressor output being directly delivered to the engine cylinder.

While the structures and arrangements disclosed herein form preferred embodiments in this invention, this invention is not limited to these precise structures and arrangements, and changes may be made therein without departing from this invention, the scope of which is defined by the appended claims.

What is claimed is:

1. In a radial flow rotary compressor for exhaust-driven turbosupercharger apparatus of the character described for supercharging a two-cycle internal combustion engine by compressing a gaseous supercharge medium for introduction into said internal combustion engine at moderate superatmospheric pressures, said compressor having a generally disc-shaped rotating impeller with radially disposed impeller blades extending axially from one face thereof, said blades having leading and trailing faces as said impeller rotates, the radial edges of said blades axially disposed opposite to the connection of said blades to said face of said impeller disc defining a generally conical locus for accepting said gaseous medium adjacent the axis of said impeller and discharging it under pressure at the radially outer periphery of said impeller and said blades, the combination which comprises annular nozzle ring means extending substantially completely circumferentially around said impeller adjacent the periphery of said blades thereon but radially within said periphery and in a plane substantially parallel to said impeller disc but axially spaced therefrom in the same direction as said blades axially extend therefrom for injecting an auxiliary compressed gaseous propellant against said trailing faces of said blades for providing auxiliary driving force thereto as said impeller rotates, and means for supplying said auxiliary compressed gaseous propellant to said annular nozzle ring means for said injection therethrough, the direction of said nozzle means being disposed obliquely radially outwardly in the direction of said impeller blades for directing said auxiliary propellant for impingement against said trailing faces of said impeller blades, said obliquely directed auxiliary propellant having a component acting on the back of said impeller blades directed radially outward, another component acting axially in the direction of said impeller blades, and a further component acting in the direction of rotation of said impeller blades thereby forming an encompassing envelope about the circumference of said impeller blades and also effecting said auxiliary driving force.

2. Apparatus as recited in claim 1 in which said annular nozzle ring means includes a substantially continuous annular nozzle slot therearound having an inlet side for said auxiliary gaseous propellant and an outlet side therefor, with said outlet side of said annular nozzle being radially outwardly disposed on a larger circumference than said inlet side but positioned radially inwardly on a smaller circumference than the outer periphery of said blades on said impeller.

3. Apparatus as recited in claim 1 in which said annular nozzle ring means includes a plurality of generally obliquely radially outwardly disposed passages each of which has an inlet end for said auxiliary gaseous propellant and an outlet end therefor adjacent said blades of said impeller, and in which all said inlet ends of said passages are disposed radially inwardly of said outlet ends thereof and with all of said outlet ends thereof being disposed radially inwardly of said periphery of said blades on said impeller, and all of said passages being additionally disposed at an angle to the plane of said impeller disc in the direction of rotation thereof and with respect to the locus of the cylindrical surface defined by the outer peripheries of said blades as said impeller rotates for directing said auxiliary propellant against said trailing faces of said blades.

4. Apparatus as recited in claim 1 in which said means for supplying said auxiliary compressed gaseous propellant to said annular nozzle ring means for injection therethrough includes an annular conduit axially spaced from said impeller and in flow communication with said nozzle means for supplying said auxiliary propellant substantially entirely all around the circumference of said annular nozzle ring means.

5. Apparatus as in any of claims 1, 2, 3, or 4 wherein the obliquely radially outwardly directed auxiliary propellant impinges against the trailing faces of said impeller blades at an angle such that the major portion of said auxiliary propellant is deflected radially outward and is admixed with the output of said compressor and a minor portion of said auxiliary propellant is deflected radially inward.

References Cited

UNITED STATES PATENTS

| 2,115,921 | 5/1938 | Steiner | 230—56 |
| 2,399,072 | 4/1946 | Thompson. | |
| 2,737,017 | 3/1956 | Feiss | 60—13 |
| 3,079,121 | 2/1963 | Griffing. | |
| 3,091,077 | 5/1963 | Erickson et al. | 60—13 |
| 3,190,068 | 6/1965 | Williams et al. | |

WENDELL E. BURNS, Primary Examiner

U.S. Cl. X.R.

60—13; 103—103; 123—74, 119; 230—56, 115